(12) United States Patent
Trueman

(10) Patent No.: US 8,955,626 B2
(45) Date of Patent: Feb. 17, 2015

(54) ELECTRIC HYBRID VEHICLE

(75) Inventor: Neil Trueman, West Midlands (GB)

(73) Assignee: Protean Electric Limited (GB)

( * ) Notice: Subject to any disclaimer, the term of this patent is extended or adjusted under 35 U.S.C. 154(b) by 0 days.

(21) Appl. No.: 13/991,918

(22) PCT Filed: Dec. 6, 2011

(86) PCT No.: PCT/GB2011/052406
§ 371 (c)(1),
(2), (4) Date: Oct. 17, 2013

(87) PCT Pub. No.: WO2012/076870
PCT Pub. Date: Jun. 14, 2012

(65) Prior Publication Data
US 2014/0048345 A1    Feb. 20, 2014

(30) Foreign Application Priority Data
Dec. 6, 2010    (GB) .................................. 1020636.5

(51) Int. Cl.
*B60K 6/48* (2007.10)
*B60K 6/52* (2007.10)
(Continued)

(52) U.S. Cl.
CPC ... *B60K 6/48* (2013.01); *B60K 6/52* (2013.01); *B60K 7/0007* (2013.01); *B60W 10/06* (2013.01); *B60W 10/08* (2013.01); *B60W 10/26* (2013.01); *B60W 20/102* (2013.01); *B60W 30/02* (2013.01); *B60T 1/10* (2013.01); *B60T 13/586* (2013.01); *B60L 7/26* (2013.01); *B60W 20/10* (2013.01); *B60W 2510/244* (2013.01); *B60W 2520/10* (2013.01); *B60W 2520/105* (2013.01);
(Continued)

(58) Field of Classification Search
USPC .............. 180/65.1–65.51, 65.8; 903/902–907
See application file for complete search history.

(56) References Cited

U.S. PATENT DOCUMENTS 5,562,566 A * 10/1996 Yang ................................. 477/3
6,484,830 B1 * 11/2002 Gruenwald et al. ...... 180/65.245
(Continued)

FOREIGN PATENT DOCUMENTS

DE   102008061512 A1   9/2009
EP       2080682 A2    7/2009
(Continued)

OTHER PUBLICATIONS

Intellectual Property Office, Combined Search and Examination Report for GB1020636.5, Dec. 31, 2010, pp. 1-3, UK.
(Continued)

*Primary Examiner* — John Walters
*Assistant Examiner* — James Triggs
(74) *Attorney, Agent, or Firm* — The Mason Group Patent Specialists LLC; Valerie M. Davis

(57) ABSTRACT

A vehicle (100) comprising an engine (103) arranged to apply a first drive torque to a first wheel (101) for moving the vehicle (100); and an electric motor (40) arranged to apply a second drive torque to a second wheel (101) for moving the vehicle (100) when in a drive mode and to generate a current when placed in a braking mode of operation and the electric motor (40) is being driven by the second wheel (101), wherein the electric motor (40) is arranged to operate in the braking mode when the engine (103) is applying a drive torque to the first wheel (101).

9 Claims, 5 Drawing Sheets

(51) Int. Cl.
*B60K 7/00* (2006.01)
*B60W 10/06* (2006.01)
*B60W 10/08* (2006.01)
*B60W 10/26* (2006.01)
*B60W 20/00* (2006.01)
*B60W 30/02* (2012.01)
*B60T 1/10* (2006.01)
*B60T 13/58* (2006.01)
*B60L 7/26* (2006.01)

(52) U.S. Cl.
CPC ........ *B60W2540/04* (2013.01); *B60W 2540/10* (2013.01); *B60W 2540/18* (2013.01); *B60W 2550/402* (2013.01); *B60W 2710/0666* (2013.01); *B60W 2710/083* (2013.01); *Y02T 10/6221* (2013.01); *Y02T 10/6265* (2013.01); *Y02T 10/6286* (2013.01); *B60K 2007/0038* (2013.01); *B60K 2007/0092* (2013.01); *Y10S 903/947* (2013.01)
USPC ........................................ 180/65.25; 903/947

(56) References Cited

U.S. PATENT DOCUMENTS

| | | | |
|---|---|---|---|
| 6,569,055 B2 * | 5/2003 | Urasawa et al. | 477/5 |
| 6,817,432 B2 * | 11/2004 | Kitada et al. | 180/65.245 |
| 6,973,880 B2 * | 12/2005 | Kumar | 105/35 |
| 7,004,273 B1 * | 2/2006 | Gruenwald et al. | 180/65.245 |
| 7,185,591 B2 * | 3/2007 | Kumar et al. | 105/35 |
| 7,595,597 B2 * | 9/2009 | King et al. | 318/139 |
| 8,172,720 B2 * | 5/2012 | Yang | 477/5 |
| 2002/0007974 A1 | 1/2002 | Nagano et al. | |
| 2002/0013194 A1 | 1/2002 | Kitano et al. | |
| 2005/0056475 A1 | 3/2005 | Roberts | |
| 2005/0099146 A1 | 5/2005 | Nishikawa et al. | |
| 2008/0246430 A1 | 10/2008 | Yanagihara | |
| 2008/0302590 A1 | 12/2008 | Sato | |
| 2009/0145673 A1 | 6/2009 | Soliman et al. | |

FOREIGN PATENT DOCUMENTS

| | | |
|---|---|---|
| EP | 2172378 A1 | 4/2010 |
| FR | 2901762 A1 | 12/2007 |
| WO | 2007138223 A1 | 12/2007 |

OTHER PUBLICATIONS

Intellectual Property Office, Notification of Grant for GB1020636.5 Patent Serial No. GB2486632, Mar. 4, 2014, pp. 1-2, UK.

Intellectual Property Office, Publication Document for Grant of GB1020636.5, Patent Serial No. GB2486632, Apr. 4, 2014, pp. 1-18, UK.

WIPO, PCT International Search Report for PCT/GB2011/052406, Jul. 17, 2012, pp. 1-4, European Patent Office.

* cited by examiner

ELECTRIC HYBRID VEHICLE

FIELD OF THE INVENTION

The present invention relates to an electric hybrid vehicle, in particular an electric hybrid vehicle having an electric motor and an internal combustion engine.

BACKGROUND OF THE INVENTION

With increased interest being placed in environmentally friendly vehicles there has, perhaps unsurprisingly, been a corresponding increase in interest in the use of electric and electric hybrid vehicles.

In particular, electric hybrid cars have become increasingly popular, where a user of an electric hybrid vehicle is able to benefit from the extensive refueling infrastructure available for vehicles having an internal combustion engine while also benefiting from the fuel efficiency provided by an electric motor.

However, to fully utilize the advantages provided by a vehicle having an electric drive system it will typically be necessary for a battery within the vehicle, which is required to power an electric motor, to be charged at regular intervals. This has the disadvantage of making the vehicle unavailable for use during the charging process.

Further, due to the limited recharging infrastructure available for electric vehicle, there is no guarantee of an available battery recharging point at a required location.

OBJECT OF THE INVENTION

The invention seeks to improve this situation.

SUMMARY OF THE INVENTION

In accordance with an aspect of the present invention there is provided a vehicle and method according to the accompanying claims.

This provides the advantage of allowing a battery within an electric vehicle to be charged while the vehicle is being driven, thereby allowing an electric vehicle to be used during a recharging process.

Further, by performing a recharging process while a vehicle is being driven it is possible to set the recharge rate at a higher level than that which would be available using a fixed recharging point.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
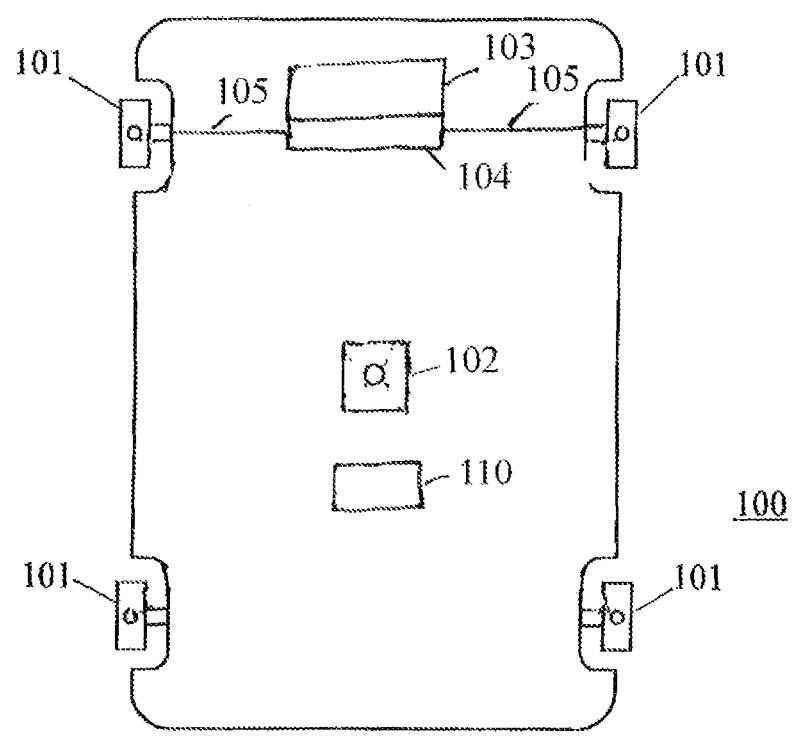
FIG. 1 illustrates a vehicle according to an embodiment of the present invention.

FIG. 1 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within the wheels 101 in the vehicle's aft position are in-wheel electric motors, as described in detail below. Although the current embodiment describes a vehicle having in-wheel electric motors associated with the wheels 101 located in the vehicle's aft position, as would be appreciated by a person skilled in the art the in-wheel electric motors can be located in other wheels. For example, in-wheel electric motors can be located in the front two wheels. Additionally, although the present embodiment describes the use of in-wheel electric motors, other electric motor configurations can be used, for example a centrally mounted electric motor that uses a drive shaft and/or a gearbox to power the respective vehicles wheels. However, for ease of retrofitting the use of in-wheel electric motors is the preferred embodiment.

The in-wheel electric motors are arranged to provide either a drive torque or a braking torque, as described below.

The vehicle also includes a power storage device 110, for example a battery 110, for providing charge to the in-wheel electric motors, which is used to allow the in-wheel electric motors to provide a drive torque.

Coupled to the in-wheel electric motors and to a vehicle communication bus, for example a CAN bus (not shown), is a master controller 102 for controlling drive and braking torque generated by the in-wheel electric motor.

Located in the vehicle is an internal combustion engine 103 that for the purposes of the present embodiment is coupled to the two front wheels; for example via a gear box 104, having a plurality of gears, and drive shafts 105. However, the internal combustion engine 103 can be arranged to drive other wheels of the vehicle, including the wheels that are being driven by the in-wheel electric motors. The internal combustion engine 103 is arranged to apply torque to the two front wheels, as is well known to a person skilled in the art. The drive torque produced by the engine and in-wheel electric motors is controlled via a throttle pedal (not shown) situated in the vehicle and operated by a driver of the vehicle. The torque applied by the engine to the wheels is dependent on the engine torque and the selected gear of the gear box, as is well known to a person skilled in the art.

For the purpose of illustration the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors. Typically, upon demand, an in-wheel electric motor will be configured to provide both drive torque and regenerative braking torque.

Figure 2:
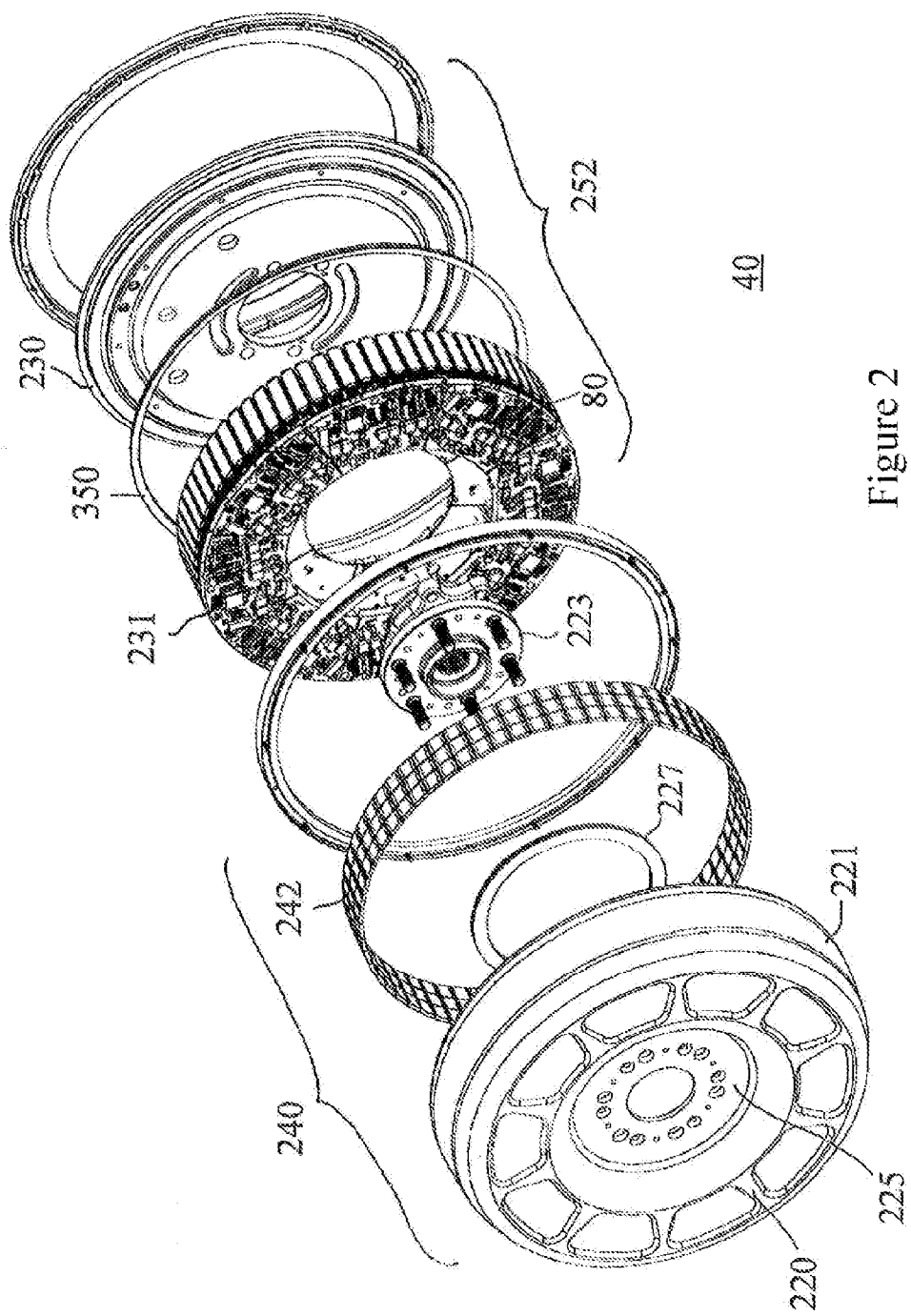
FIG. 2 illustrates an exploded view of an electric motor as used in an embodiment of the present invention.

As illustrated in FIG. 2, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself.

Figure 3:
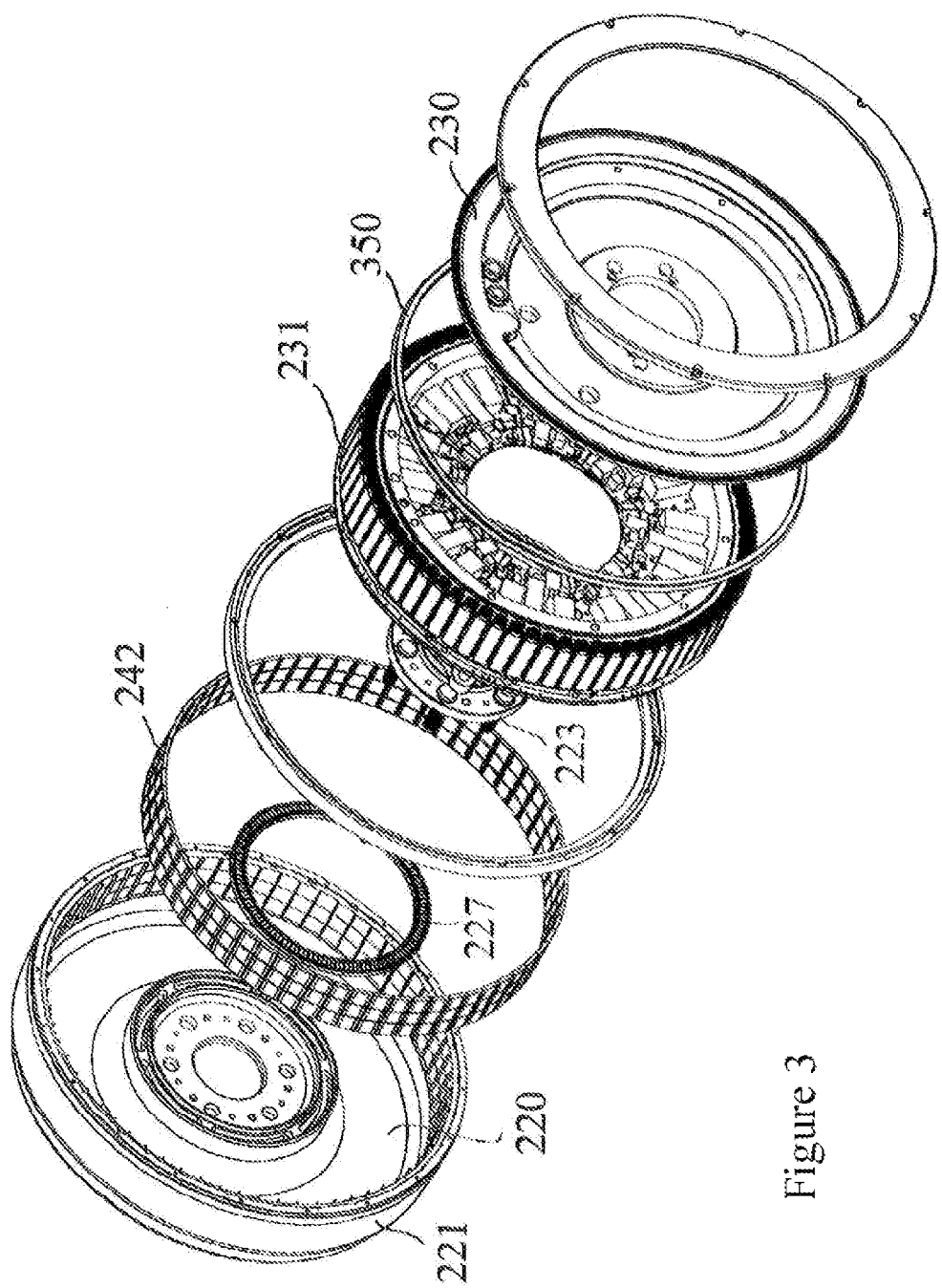
FIG. 3 illustrates an exploded view of the electric motor shown in FIG. 3 from an alternative angle.

FIG. 3 shows an exploded view of the same assembly as FIG. 2 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 2 are circuit boards 80 carrying control electronics, otherwise known as motor drive controllers. Additionally in FIGS. 2 and 3 a V shaped seal 350 is provided between the circumferential wall 221 of the rotor and the outer edge of the stator housing 230. Further, in FIG. 3, a magnetic ring 227 comprising a commutation focusing ring and a plurality of magnets is provided for the purpose of indicating the position of the rotor with respect to the stator to a series of sensors arranged on the motor drive controllers 80 of the stator 252.

The electric motor 40 shown in FIGS. 2 and 3 is a three phase motor having three coil sets. In this embodiment, each coil set includes eight coil sub-sets. However, as would be appreciated by a person skilled in the art, the electric motor could have any number of coil sets and coil sub-sets. The coil sub-sets of each coil set are labeled 44, 46 and 48, respectively in FIG. 4. Accordingly, the electric motor illustrated in FIG. 4 has a total of twenty four coil sub-sets (i.e. eight coil sub-sets per coil set).

Figure 4:
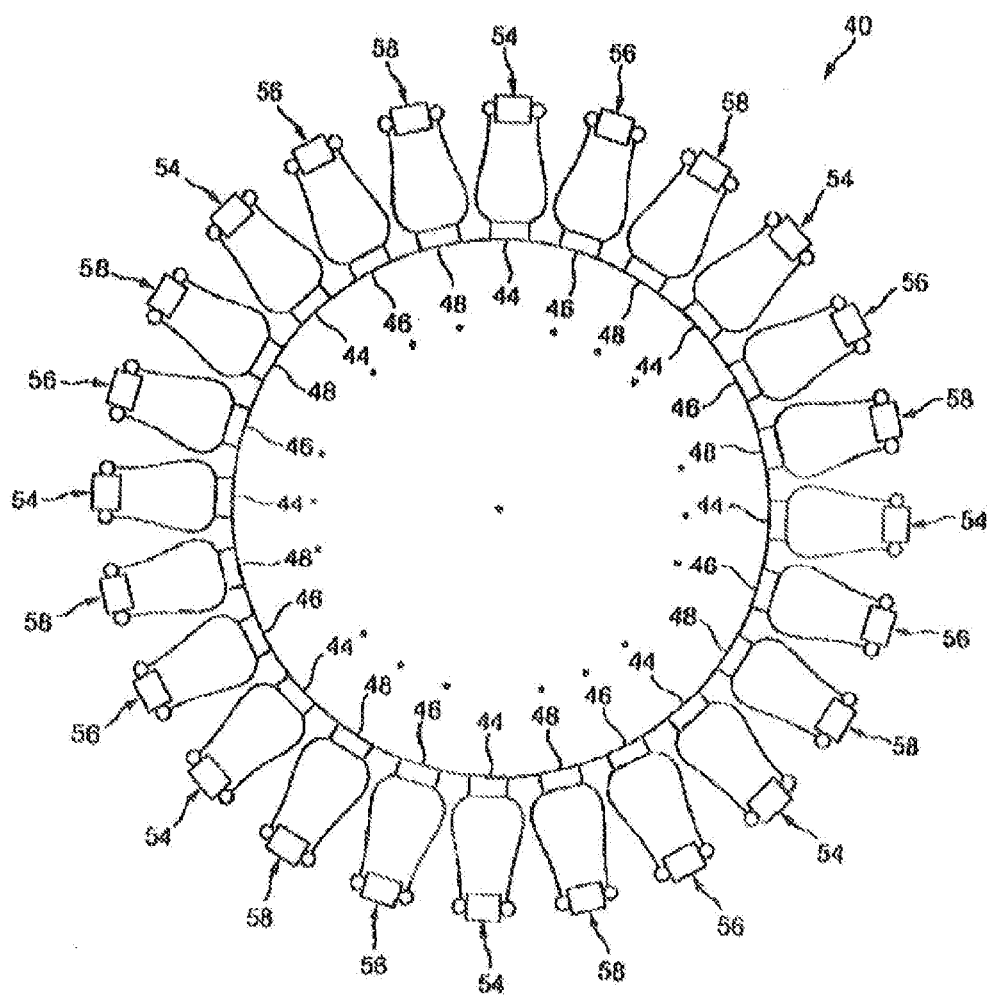
FIG. 4 schematically shows an example for a three phase motor according to an embodiment of the present invention.

By way of example, in FIG. 4 some of the coil sub-sets are highlighted with a '*'. If these coil sub-sets were to be powered down, the motor would still be able to operate, albeit with reduced performance. In this way, the power output of the motor can be adjusted in accordance with the requirements of a given application. In one example, where the motor is used in a vehicle such as a car, powering down of some of the coil sub-sets can be used to adjust the performance of the car. In the example shown in FIG. 5, if each of the coil sub-sets indicated with an '*' were powered down the motor would have three coil sets with each coil set having two active coil subsets.

Powering down of one or more of the coil sub-sets has the further benefit that in the event of a failure of one of the coil sub-sets, other coil sub-sets in the motor 40 can be powered down resulting in continued operation of the motor 40 in a manner which retains a balanced magnetic field profile around the periphery of the motor for appropriate multiphase operation.

A motor drive controller 80 is arranged to drive a group of three coil subsets. For example, a motor drive controller can be associated with the first three coil subsets 44, 46, 48 located at the top of FIG. 5. Another motor drive controller 80 is associated with the next three coil subsets, and so on. Accordingly, the in-wheel electric motor includes eight motor drive controllers 80 arranged to drive the respective coil subsets to form a distributed internal motor architecture that uses multiple motor drive controllers 80 for controlling the torque generated by the in-wheel electric motor.

The distributed motor drive controller configuration, where each motor drive controller 80 drives a group of three coil sub-sets with a three phase voltage, can be regarded as a group of logical sub motors. Each logical sub-motor can be driven independently of the other sub motors within the in-wheel electric motor with each logical sub-motor being driven as a three phase motor.

The motor drive controller 80, which acts as an inverter for the associated logical sub-motor, includes a number of switches which may typically comprise one or more semiconductor devices. The motor drive controller 80 includes a printed circuit board upon which a number of components are mounted. The circuit board includes means for fixing the motor drive controller 80 within the electric motor 40, for example, adjacent to the coil sub-sets that the respective motor drive controller controls. In the illustrated example, these means include apertures through which screws or suchlike can pass. In this example, the printed circuit board is substantially wedge-shaped. This shape allows multiple motor drive controllers 80 to be located adjacent each other within the motor, forming a fan-like arrangement.

The motor drive controller 80 switches can include semiconductor devices such as MOSFETs or IGBTs. In the present example, the switches comprise IGBTs. However, any suitable known switching circuit can be employed for controlling the current within the coils of the coil sub-set associated with the motor drive controller 80. One well known example of such a switching circuit is the three phase bridge circuit.

Each motor drive controller 80 also includes a processor, where the processor is arranged to operate the switches in accordance with a pulse width modulation scheme for controlling the torque of the respective logical sub motor, as is well known to a person skilled in the art. The processor is arranged to receive a torque demand from the master controller 102 via a CAN interface, however any form of communication link between the master controller 102 and the respective motor drive controller 80 can be used.

In response to control signals from the master controller 102 that are indicative of a required torque, each motor drive controller 80 is arranged to pulse width modulate a signal applied to the semiconductor switches that form a three phase bridge circuit to control the voltage applied to the set of three coil subsets for the purposes of generating an electric motor torque, as is well known to a person skilled in the art.

The in-wheel electric motor is arranged to generate either a drive torque or a braking torque dependent upon whether the stator current leads or follows the rotor flux vector, as controlled by the motor drive controller switches as part of the pulse width modulation scheme, as is well known to a person skilled in the art.

While providing a braking torque the in-wheel electric motors typically generate a current. This mode of operation is typically referred to as regenerative braking. Typically, during regenerative braking, current that is generated by the in-wheel electric motors is provided to the battery 110 to allow the battery 110 to be recharged, thereby allowing for the recovering of energy generated during regenerative braking.

Accordingly, when the vehicles braking system is initiated, the in-wheel electric motors are arranged to provide a braking torque, thereby allowing current generated by the in-wheel electric motors to be used to recharge the battery 110.

To facilitate the recharging of the vehicle's battery 110, the master controller 120 is arranged, upon driver selection or other predetermined criteria, to place the in-wheel electric motors into a regenerative braking mode while the vehicle's internal combustion engine is applying a driving torque to the front wheels. Accordingly, while the internal combustion engine is providing a driving torque to the front wheels of the vehicle causing the vehicle to move, the in-wheel motors provide a braking torque that is used to generate a current for recharging the vehicle's battery 110. This allows the vehicle's battery 110 to be sufficiently charged at a specific time without the need to charge the vehicle's battery 110 via an external source.

As stated above, the regenerative braking mode may be entered upon driver selection, other examples of predetermined criteria could include one or more of the following: battery charge levels (for example if the battery charge level falls below a predetermined level), time of day, location of vehicle, intended destination of vehicle (for example, if the intended destination is in a congestion charge).

During the regenerative braking mode in which the internal combustion engine 103 is being used to drive the vehicle, to ensure the handling characteristics of the vehicle are not adversely compromised and the driveability of the vehicle is not impeded, the magnitude of the braking torque demand generated by the master controller will vary, for example based upon vehicle speed and steering angle. The braking torque demand may also be limited based on other criteria, for example if the in-wheel electric motors are working near the limits of their operational envelope, for example near their maximum operating temperature.

Examples of how braking torque provided by the in-wheel electric motors is varied dependent upon vehicle speed and steering angle, while the vehicles internal combustion engine 103 is providing driving torque to drive the vehicle, will now be described.

Figure 5:
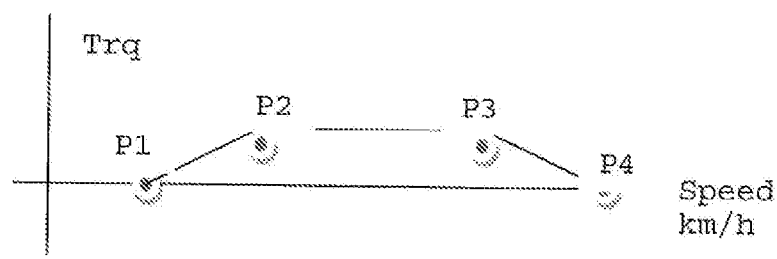
FIG. 5 illustrates a brake torque verse vehicle speed according to an embodiment of the present invention.

FIG. 5 illustrates an example of a braking torque verses vehicle speed curve.

As the internal combustion engine 103 accelerates the vehicle from standstill, to avoid any adverse effect on how the vehicle pulls away the braking torque provided by the in-wheel electric motors is set to zero until a first threshold speed has been reached, for example 10 km/h. Once the vehicle has reached the first threshold speed the in-wheel brake torque is progressively increased until a second threshold speed has been reached with the current generated by the in-wheel electric motors progressively increasing with increasing braking torque to a first predetermined brake torque threshold value. Although FIG. 5 shows a linear increase in braking torque provided by the in-wheel electric motors any brake torque/speed relationship may be adopted. For the purposes of the present embodiment the first predetermined percentage brake torque threshold is 15% of total possible braking torque, however any suitable percentage may be selected. The predetermined brake torque percentage threshold is selected so not to adversely compromise the handling or drivability characteristics of the vehicle.

The criteria for determining at what speed the first predetermined percentage brake torque threshold is reached can be based on a number of different criteria, for example handling or drivability characteristics of the vehicle at a specific speed and brake torque or on an engine efficiency region (for example, the first predetermined percentage brake torque threshold could be based upon the engine operating in its most efficient region).

Once the first predetermined percentage brake torque threshold has been reached, the brake torque is kept substantially constant up to a second predetermined vehicle speed. The criteria for determining at what speed the second predetermined vehicle speed is reached can be based on a number of different criteria, for example when the engine efficiency region drops below a threshold value.

Above the second predetermined vehicle speed the braking torque is arranged to progressively reduce, thereby minimizing the risk of high speed driving being adversely affected by brake torque being applied by the in-wheel electric motors and/or the maximum charge current that can be provided to the battery being exceeded.

For the purposes of the embodiment shown in FIG. 5 the speed and brake torque values are as follows:

Speed P1=10 km/h, P2=60 km/h, P3=100 km/h, and P4=160 km/h

Torque P1=0%, P2=15%, P3=15%, and P4=0%

For two in-wheel electric motors capable of generating 500 Nm torque each the configuration shown in FIG. 5 is likely to provide up to 1 C of charge (a continuous 70 A) between points P2 and P3 in FIG. 4, where for constant torque the regenerated current will be approximately proportional to speed. Accordingly, to maintain a constant charging current the torque will need to be reduced as speed of the vehicle increases. For the purposes of the present embodiment, the braking torque generated by each motor between points P2 and P3 will be 15% of 500 Nm (i.e. 150 Nm of braking torque for the pair of motors). This is equivalent to providing 5+times more current than conventional UK single phase supply.

Figure 6:
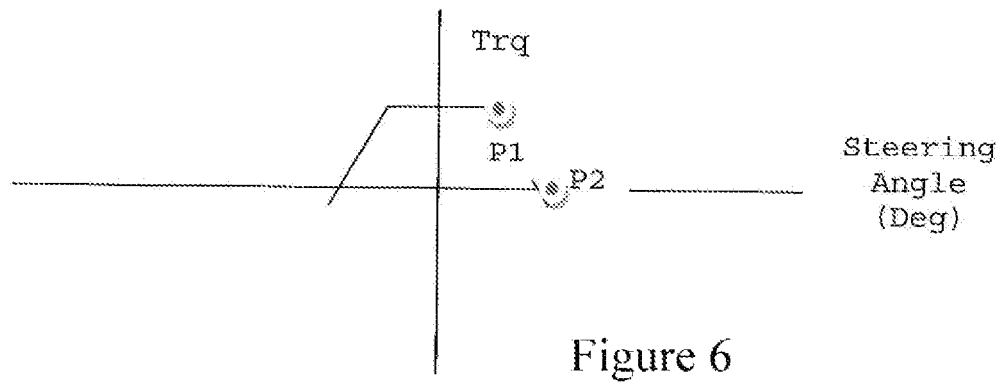
FIG. 6 illustrates a brake torque verse steering angle according to an embodiment of the present invention.

FIG. 6 illustrates an example of a braking torque versus steering wheel angle curve. Typically the variation in braking torque versus steering wheel angle will be used in conjunction with the braking torque versus speed curve.

With reference to FIG. 6, the brake torque demand will be fully available during a shallow steering wheel angle but will fade as the steering wheel angle exceeds a first steering wheel angle threshold value with the braking torque progressively moving to zero as the steering wheel angle increase to a second steering wheel angle threshold value. The first steering wheel angle threshold value and second steering wheel threshold value are selected to minimize the risk of the handling or drivability characteristics of the vehicle being compromised.

For the purposes of the embodiment shown in FIG. 6 the brake torque and steering wheel angle values are as follows based upon the vehicle providing the first predetermined percentage braking torque threshold value when the steering wheel angle is set to zero:

Angle P1=90 deg, P2=180 deg

Torque P1=15%, P2=0%.

Although the present embodiment has a brake torque and steering wheel angle curve that has two points the brake torque and steering wheel angle curve can have any number of points. Further, the braking torque need not reduce to zero but remain as a non-zero value irrespective of steering wheel angle.

Additionally, the controller can be adapted to include functionality to vary the braking torque applied by the in-wheel electric motors dependent upon the longitudinal acceleration of the vehicle. To allow maximum acceleration of the vehicle, for example when overtaking another vehicle, upon a threshold acceleration, or threshold accelerator pedal position, being reached the controller can be arranged to reduce brake torque generated by the in-wheel electric motors.

The invention claimed is:

1. A vehicle comprising: an engine arranged to apply a first drive torque to a first wheel for moving the vehicle; an electric motor arranged to apply a second drive torque to a second wheel for moving the vehicle when in a drive mode and to generate a current when placed in a braking mode of operation and the electric motor is being driven by the second wheel, wherein the electric motor is arranged to operate in the braking mode when the engine is applying a drive torque to the first wheel; and a controller for controlling the current generated by the electric motor when in the brake mode by controlling the amount of braking for torque generated by the electric motor, wherein the controller is arranged to place the electric motor in the brake mode based upon the efficiency region that the engine is operating in.

2. A vehicle according to claim 1, wherein the controller is arranged to place the electric motor in the brake mode based upon time of day.

3. A vehicle according to claim 1, wherein the controller is arranged to vary the amount of braking torque generated by the electric motor based upon the speed of the vehicle.

4. A vehicle according to claim 1, wherein the controller is arranged to vary the amount of braking torque generated by the electric motor based upon the steering angle of a steering wheel within the vehicle.

5. A vehicle according to claim 1, wherein the controller is arranged to vary the amount of braking torque generated by the electric motor based upon the longitudinal acceleration of the vehicle or position of an accelerator pedal.

6. A vehicle according to claim 1, wherein the controller is arranged to place the electric motor in the brake mode based upon the activation of a switch.

7. A vehicle according to claim 1, further comprising a battery for receiving the charge generated by the electric motor when in the brake mode.

8. A vehicle according to claim 7, wherein the controller is arranged to place the electric motor in brake mode based upon the activation of a switch and the state of charge of the battery being below a threshold value.

9. A vehicle according to claim 1, wherein the controller is arranged to place the electric motor in the brake mode based on location of the vehicle and intended destination.

* * * * *

UNITED STATES PATENT AND TRADEMARK OFFICE
CERTIFICATE OF CORRECTION

PATENT NO. : 8,955,626 B2
APPLICATION NO. : 13/991918
DATED : February 17, 2015
INVENTOR(S) : Neil Trueman Page 1 of 1

It is certified that error appears in the above-identified patent and that said Letters Patent is hereby corrected as shown below:

in the claims
in claim 1, column 7, line 25; the word "for" should be omitted.

Signed and Sealed this
Seventeenth Day of May, 2016

Michelle K. Lee
*Director of the United States Patent and Trademark Office*